United States Patent [19]
Balling et al.

[11] Patent Number: 5,815,754
[45] Date of Patent: Sep. 29, 1998

[54] CLOSING LIGHT LOCK OF FILM CASSETTE TURNS OFF FILM-WIND-INTO-CASSETTE MOTOR, IN ONE-TIME-USE CAMERA

[75] Inventors: Edward N. Balling, Rochester; Joel S. Lawther, East Rochester; Thomas E. Dussinger, Henrietta, all of N.Y.

[73] Assignee: Eastman Kodak Company, Rochester, N.Y.

[21] Appl. No.: 856,298

[22] Filed: May 14, 1997

[51] Int. Cl.⁶ .................................................... G03B 1/18
[52] U.S. Cl. .......................... 396/403; 396/418; 396/514; 396/538
[58] Field of Search ................................. 396/6, 403, 404, 396/405, 411, 418, 513, 514, 538

[56] References Cited

U.S. PATENT DOCUMENTS

| | | |
|---|---|---|
| 2,398,133 | 4/1946 | Cronholm . |
| 4,171,893 | 10/1979 | Kawazoe . |
| 4,455,074 | 6/1984 | Wong et al. .............................. 396/405 |
| 4,482,226 | 11/1984 | Tamamura . |
| 4,821,059 | 4/1989 | Nakanishi et al. . |
| 5,600,395 | 2/1997 | Balling et al. . |

*Primary Examiner*—Howard B. Blankenship
*Attorney, Agent, or Firm*—Roger A. Fields

[57] ABSTRACT

A camera for use with a film cassette having a spool rotatable to wind an exposed filmstrip including a trailing film end portion into the cassette and a light lock movable to be closed after the trailing film end portion is wound into the cassette, comprising a film winder rotatable in engagement with the spool in a film winding direction to rotate the spool in the same direction to wind the exposed filmstrip including the trailing film end portion into the cassette, and a closing actuator movable in engagement with the light lock to close the light lock, is characterized in that a drive motor is drivingly connected with the film winder to rotate the film winder in the film winding direction, and a motor switch capable of changing state to turn off the drive motor is disposed to change state to turn off the drive motor when the closing actuator is moved to close the light lock.

3 Claims, 8 Drawing Sheets

CLOSING LIGHT LOCK OF FILM CASSETTE TURNS OFF FILM-WIND-INTO-CASSETTE MOTOR, IN ONE-TIME-USE CAMERA

FIELD OF THE INVENTION

The invention relates generally to the field of photography, and in particular to cameras to be used with film cassettes. More specifically, the invention relates to a motorized one-time-use camera with a film-wind-into-cassette motor that is turned off when the film cassette is closed following winding of an exposed filmstrip into the cassette.

BACKGROUND OF THE INVENTION

It is typical in motorized cameras to be used with film cassettes for the film drive motor to be turned off in response to winding the exposed filmstrip into the cassette.

Commonly assigned prior art U.S. Pat. No. 5,357,303 issued Oct. 18, 1994 discloses a film cassette having a spool rotatable to wind an exposed filmstrip including a trailing film end portion into the cassette, and a light lock pivotable closed after the trailing film end portion is wound into the cassette. The light lock is closed to prevent ambient light from entering the cassette when the filmstrip is in the cassette.

Commonly assigned prior art U.S. Pat. Nos. 5,600,395 issued Feb. 7, 1997 and No. 5,614,976 issued Mar. 25, 1997 each discloses a one-time-use camera for use with the film cassette disclosed in U.S. Pat. No. 5,357,303. The camera includes a film winder thumbwheel manually rotatable in coaxial engagement with the spool inside the cassette, in a film winding direction, to similarly rotate the spool to wind the exposed filmstrip including the trailing film end portion into the cassette. A closing actuator is coaxially engaged with the light lock to close the light lock when an integral film sensor of the closing actuator senses the trailing film end portion is wound into the cassette. A locking tooth is moved into peripheral engagement with the film winder thumbwheel to prevent further manual rotation of the thumbwheel in the film winding direction when the light lock is closed.

SUMMARY OF THE INVENTION

A camera for use with a film cassette having a spool rotatable to wind an exposed filmstrip including a trailing film end portion into the cassette and a light lock movable to be closed after the trailing film end portion is wound into the cassette, comprising a film winder rotatable in engagement with the spool in a film winding direction to rotate the spool in the same direction to wind the exposed filmstrip including the trailing film end portion into the cassette, and a closing actuator movable in engagement with the light lock to close the light lock, is characterized in that:

a drive motor is drivingly connected with the film winder to rotate the film winder in the film winding direction; and a motor switch capable of changing state to turn off the drive motor is disposed to change state to turn off the drive motor when the closing actuator is moved to close the light lock.

Preferably, a locking device is coupled with the light lock for movement to prevent further rotation of the film winder in the film winding direction when the light lock is closed, and the motor switch is positioned for the locking device to cause the motor switch to change state to turn off the drive motor when the locking device is moved to prevent further rotation of the film winder in the film winding direction.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art. Prior art U.S. Pat. No. 5,576,790 issued Nov. 19, 1996 one type of one-time-use camera.

Film Cassette

Figure 1:
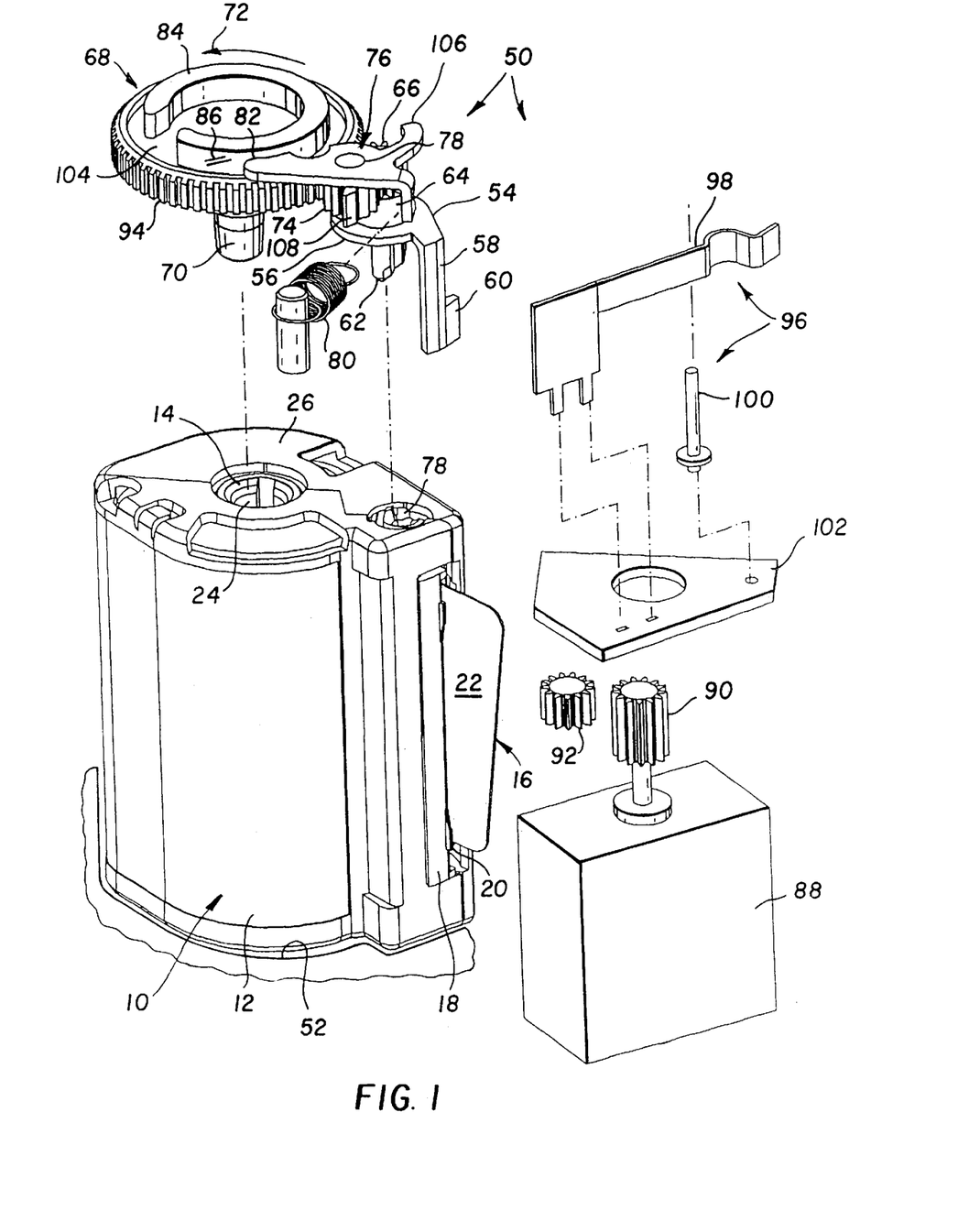
FIG. 1 is an exploded partial perspective view of a camera for use with a film cassette, according to a preferred embodiment of the invention.
Figure 2:
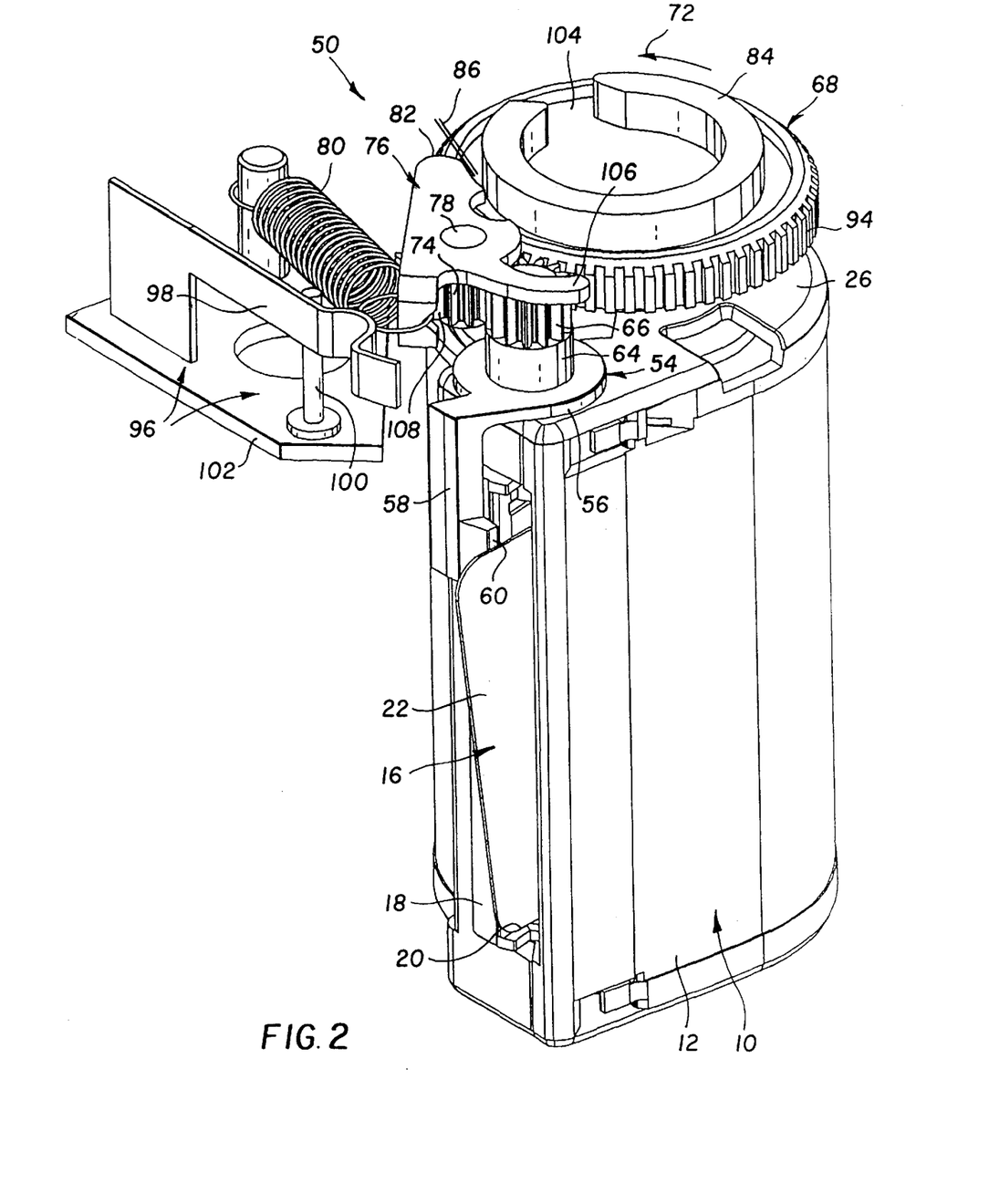
FIG. 2 is an assembled partial perspective view of the camera with the film cassette as seen from an opposite side.

Referring now to the drawings, FIGS. 1 and 2 show a film cassette 10 similar in operation to ones disclosed in prior art U.S. Pat. Nos. 5,357,303, issued Oct. 18, 1994, and No. 5,231,438, issued Jul. 27, 1993. The film cassette 10 includes a cassette shell 12 that contains a flanged spool 14 on which is stored a wound unexposed/exposed filmstrip 16. A slightly elastic light lock 18 is supported within a film egress/ingress slot 20 in the cassette shell 12 to be pivoted open to permit film movement out of and back into the shell, through the slot, and to be pivoted closed to prevent ambient light from entering the shell, through the slot.

Figure 6:
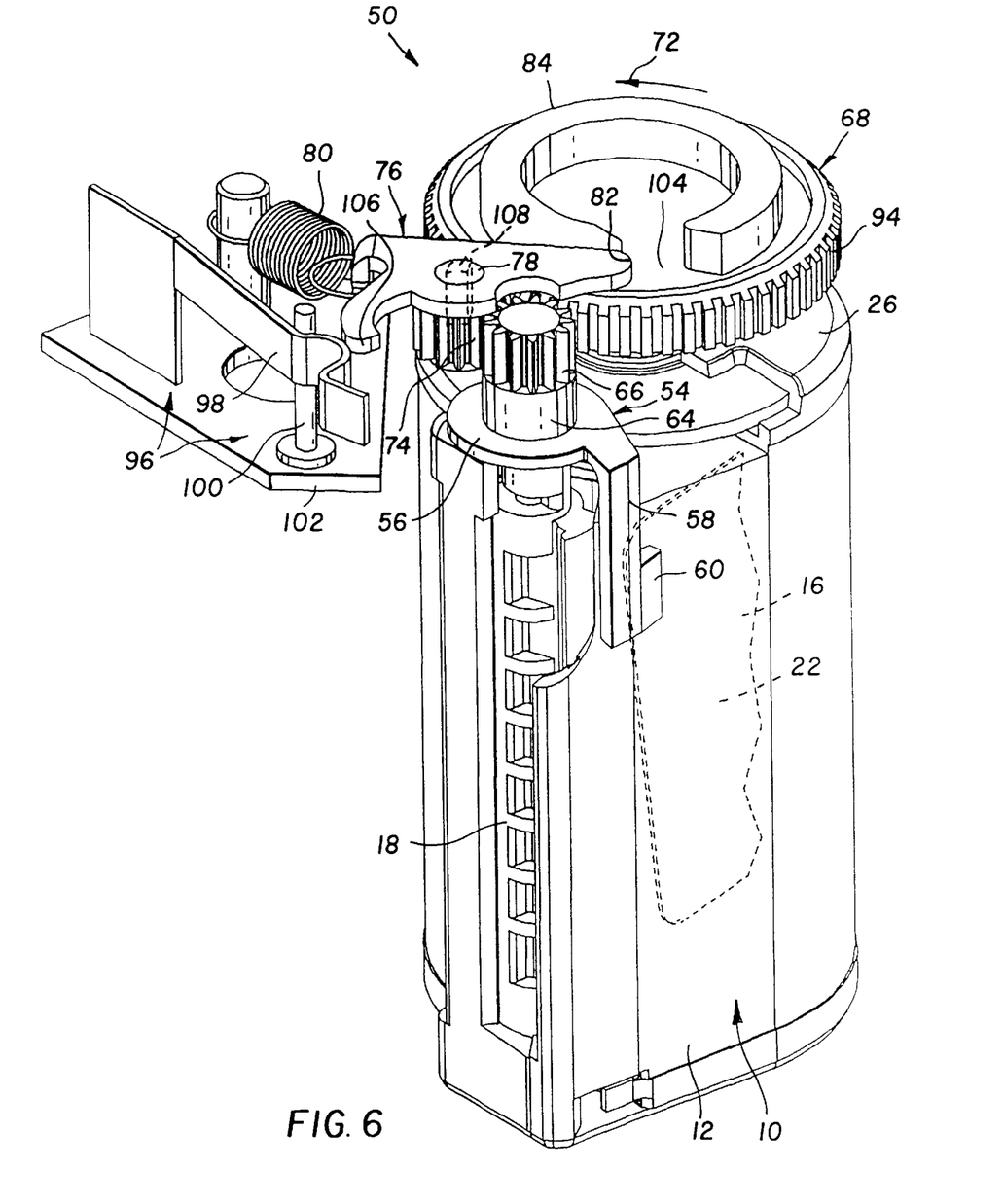

FIGS. 1 and 2 show the film cassette 10 from opposite sides, with the light lock 18 open and all but a trailing film end portion 22 of the filmstrip 16 wound into the cassette shell 12 after the filmstrip is exposed outside the cassette shell. FIG. 6 shows the light lock 18 pivoted completely closed after the trailing film end portion 22 is wound into the cassette shell 12.

Figure 7:
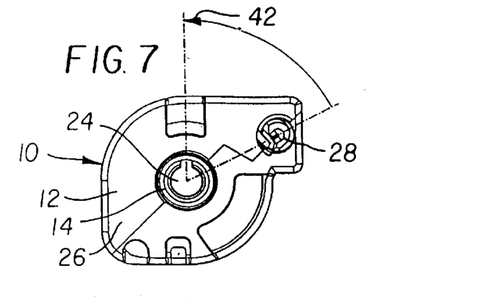
FIGS. 7, 8, 9, 10, 11, 12, 13 and 14 are opposite end views of the film cassette, depicting operation of a visual exposure indicator (VEI)
Figure 8:
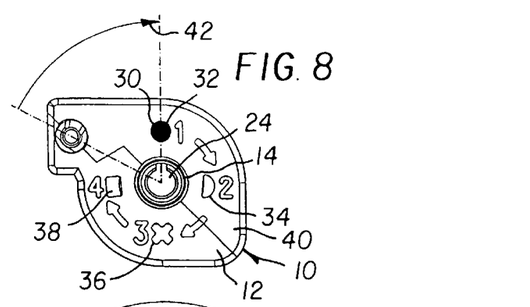
Figure 9:
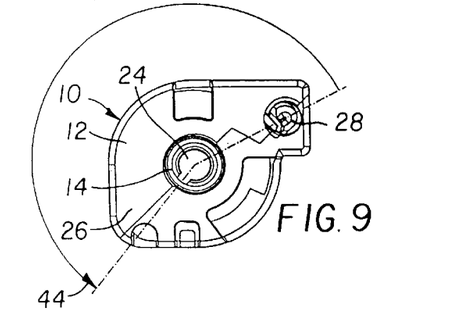
Figure 10:
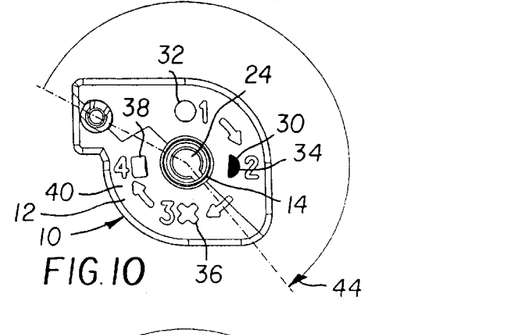
Figure 11:
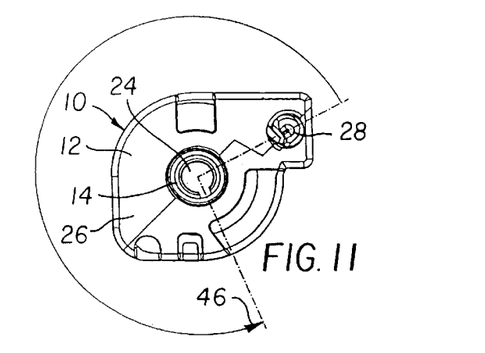
Figure 12:
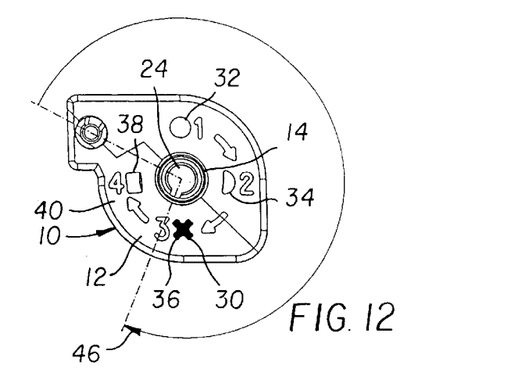
Figure 13:
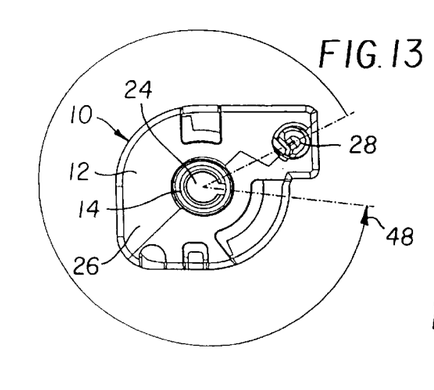
Figure 14:
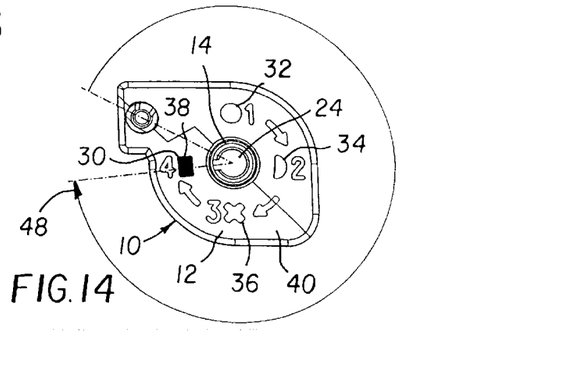

The spool 14 has a coaxial drive cavity 24 accessible at a drive end 26 of the cassette shell 12 and the light lock 18 has a coaxial drive cavity 28 accessible at the same end of the cassette shell as shown in FIG. 1. A visual exposure indicator (VEI) in the form of an indicator flag 30 is rotatable coaxially with the spool 14 to be respectively positioned in four separate windows 32, 34, 36 and 38 in a VEI end 40 of the cassette shell 12 when the spool is at different predetermined angles of rotation. The VEI end 40 of the cassette shell 12 is an opposite end of the cassette shell, with respect to the drive end 26 of the cassette shell. As shown in FIGS. 7 and 8, when the spool 14 is at a predetermined acute angle of rotation 42 the indicator flag 30 is at the same angle to be positioned in the window 32, to provide a visual film-unexposed warning or indication. As shown in FIGS. 9 and 10, when the spool 14 is at a predetermined first-obtuse angle of rotation 44 the indicator flag 30 is at the same angle to be positioned in the window 34, to provide a visual film-partially-exposed warning or indication. As shown in FIGS. 11 and 12, when the spool 14 is at a predetermined second-obtuse angle of rotation 46 the indicator flag 30 is at the same angle to be positioned in the window 36, to provide a visual film-completely-exposed warning or indication. As shown in FIGS. 13 and 14, when the spool 14 is at a predetermined third-obtuse angle of rotation 48 the indicator flag 30 is at the same angle to be positioned in the window 38, to provide a visual film-processed warning or indication.

Camera

A partially shown camera 50 with which the film cassette 10 is to be used is shown in FIGS. 1–6.

As shown in at FIG. 1, the camera 50 includes a cassette chamber 52 for the film cassette 10. The chamber 52 is open at its top and bottom, and has a film egress/ingress slot (not shown) opposite the film egress/ingress slot 20 in the cassette shell 12 to permit film movement out of and back into the chamber. An actuator unit 54 for pivoting the light lock 18 closed after the trailing film end portion 22 is wound into the cassette shell 12 comprises an integral single-piece driver 56 and film sensor lever 58. The film sensor lever 58 has a sensor head 60 shown in FIGS. 1 and 2 in contact with the trailing film end portion 22. The driver 56 has a depending drive-part 62 located in the drive cavity 28 of the light lock 18 to rotationally engage the light lock in order to pivot the light lock closed, and a coaxial upstanding gear-support-part 64 on which is coaxially fixed a first spur gear 66. Rotation of the first spur gear 66 in a counter-clockwise direction in FIGS. 1 and 2 similarly rotates the drive-part 62 to pivot the light lock 18 closed.

A film winder wheel 68 has a depending coaxial drive-part 70 located in the drive cavity 24 of the spool 14 to rotationally engage the spool. The film winder wheel 68 can be rotated in a film winding direction 72 to similarly rotate the spool 14 to wind the filmstrip 16 including the trailing film end portion 22 into the cassette shell 12, and is continuously spaced from the first spur gear 66.

A second spur gear 74 continuously in mesh with the first spur gear 66 is coaxially fixed to a locking lever 76. A mount-pin 78 rotationally supports the second spur gear 74 and the locking lever 76, and maintains the second spur gear continuously spaced from the film winder wheel 68.

A tension spring 80 biases the locking lever 76 to rotate with the second spur gear 74 in a clockwise direction in FIG. 1 about the mount-pin 78 to, in turn, bias the first spur gear 66 to rotate in a counter-clockwise direction in FIG. 1 to urge the sensor head 60 of the film sensor lever 58 against the filmstrip 16. Film resistance at the sensor head 60 is greater than the bias of the spring 80. As a result, the spring 80 is prevented from urging the locking lever 76 to rotate with the second spur gear 74 in a clockwise direction in FIG. 1 in order to move one end 82 of the locking lever against an arcuate rib 84 on the film winder wheel 68. Instead, the lever end 82 is held spaced a slight distance 86 from the arcuate rib 84.

As shown in FIG. 1, a drive motor 88 has a coaxial pinion gear 90 in continuous mesh with a driven gear 92 which, in turn, is in continuos mesh with successive peripheral teeth 94 of the film winder wheel 68. A switch 96 has a resilient switch element 98 and a rigid switch element 100. The switch 96 is connected via a circuit board 102 to a battery (not shown) and to the drive motor 88. Mutual contact of the switch elements 98 and 100 closes the switch 96 as shown in FIG. 2, which permits the drive motor 88 to be turned on. When the drive motor 88 is turned on, the pinion gear 90 is rotated in a counter-clockwise direction in FIG. 1 to rotate the driven gear 92 in a reverse direction to, in turn, rotate the film winder wheel 68 in the film winding direction 72 to similarly rotate the spool 14 to wind the filmstrip 16 including the trailing film end portion 22 into the cassette shell 12. Separation of the switch element 98 from the switch element 100 opens the switch 96 as shown in FIG. 6, which turns off the drive motor 88.

Operation

Figure 3:
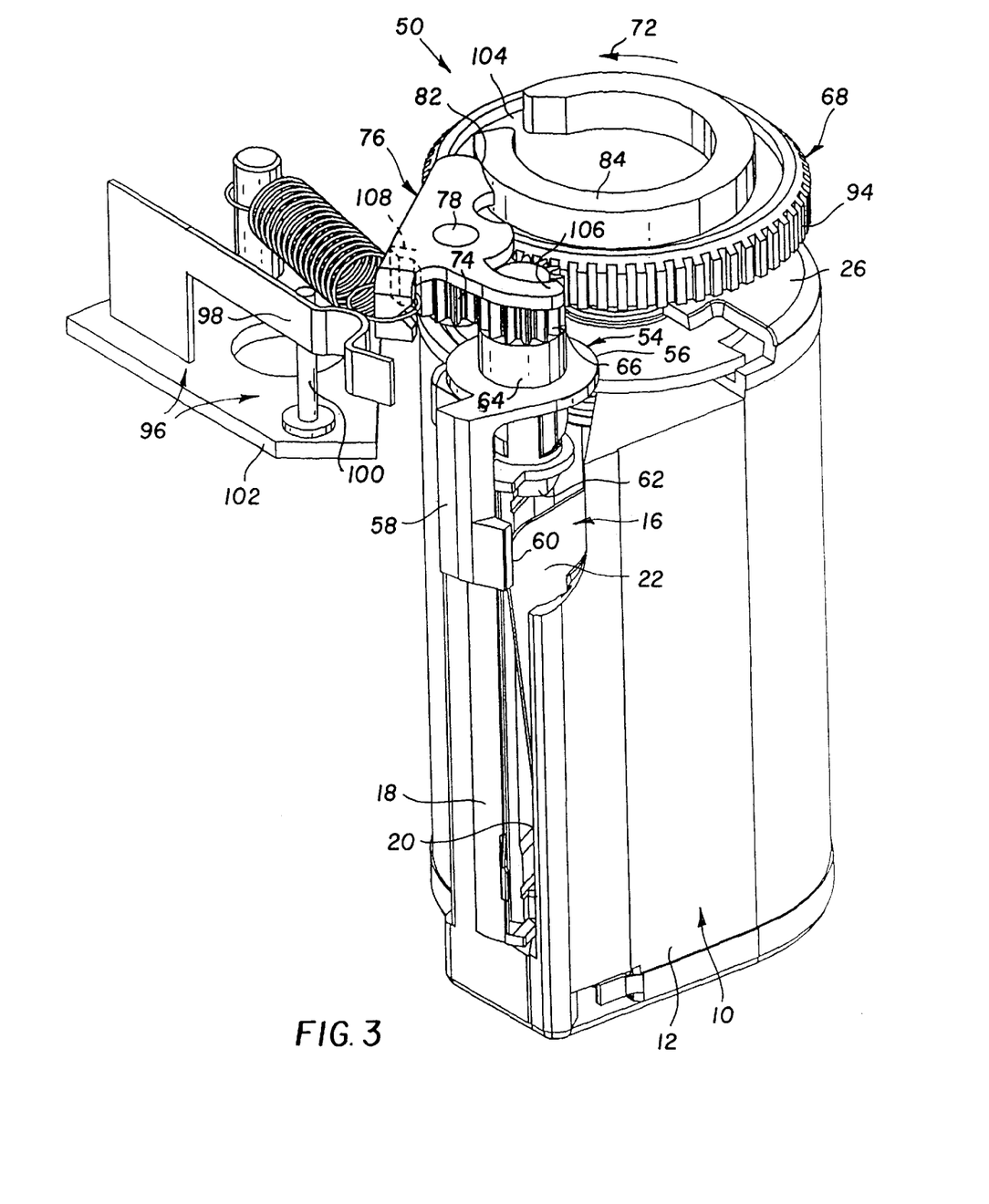
FIGS. 3, 4, 5 and 6 are assembled partial perspective views of the camera with the film cassette, depicting operation of the camera.

Going from FIGS. 1 and 2 to FIG. 3, when the film winder wheel 68 is rotated via the drive motor 88 in the film winding direction 72 the trailing film end portion 22 is drawn from the sensor head 60 of the film sensor lever 58 and into the slot 20 in the cassette shell 12. Once the trailing film end portion 22 is moved clear of the sensor head 60 the resulting absence of film resistance at the sensor head allows the spring 80 to rotate the locking lever and the second spur gear 74 clockwise in FIG. 3 about the mount-pin 78 until the lever end 82 abuts the arcuate rib 84 on the wheel 68. Consequently, the actuator unit 54 is rotated counter-clockwise in FIG. 3 via the first and second spur gears 66 and 74 to make the drive-part 62 similarly pivot the light lock 18 initially closed ten degrees as shown in FIG. 3, to partially (slightly) close the light lock.

Figure 4:
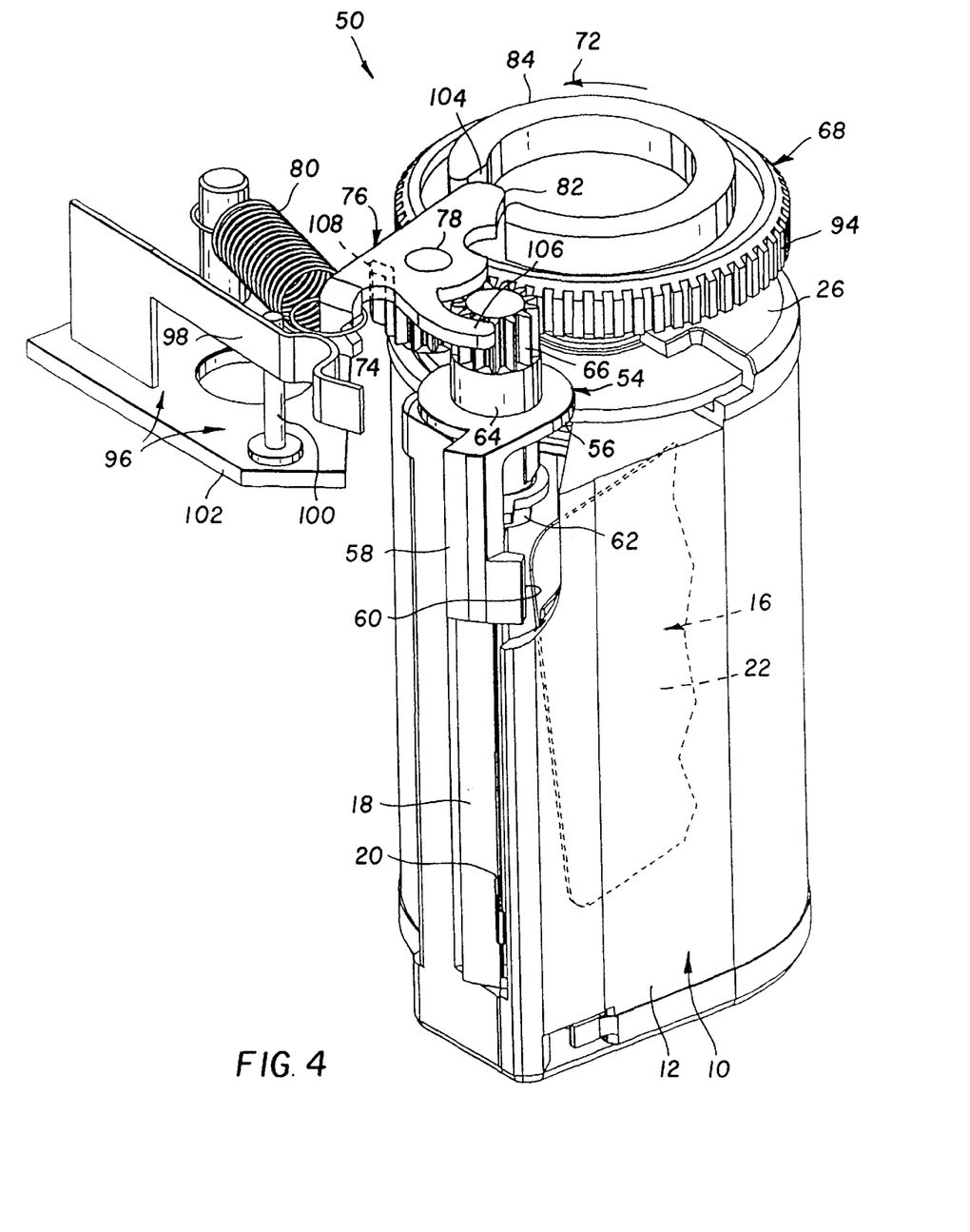

In FIG. 4, the film winder wheel 68 is rotated via the drive motor 88 further in the film winding direction 72 than in FIG. 3 to draw the trailing film end portion 22 from the slot 20 and into the interior of the cassette shell 12 and to position a gap 104 in the arcuate rib 84 opposite the lever end 82. The presence of the gap 104 opposite the lever end 82 allows the spring 80 to rotate the locking lever 76 and the second spur gear 74 clockwise in FIG. 4 about the mount-pin 78 until the lever end is seated in the gap. Consequently, the actuator unit 54 is rotated counter-clockwise in FIG. 4 via the first and second spur gears 66 and 74 to make the drive-part 62 similarly pivot the light lock 18 further closed twenty degrees as shown in FIG. 4.

Figure 5:
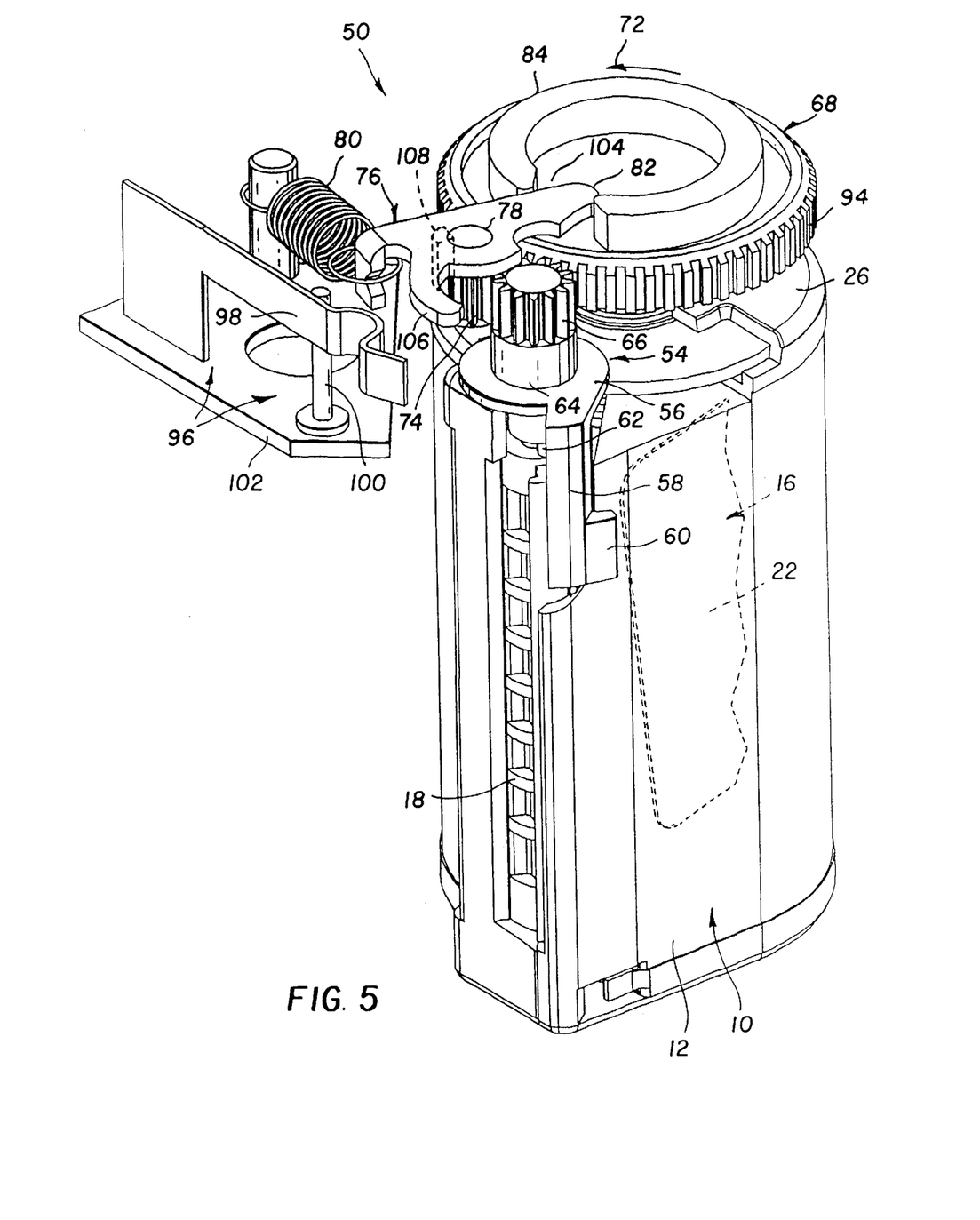

In FIG. 5, the film wind wheel 68 is rotated via the drive motor 88 further in the film winding direction 72 than in FIG. 4 to draw the trailing film end portion 22 further into the interior of the cassette shell 12 and to make the arcuate rib 84 pivot the lever end 82 to rotate the locking lever 76 and the second spur gear 74 clockwise in FIG. 5 about the mount-pin 78. Consequently, the actuator unit 54 is rotated counter-clockwise in FIG. 5 via the first and second spur gears 66 and 74 to make the drive-part 62 similarly pivot the light lock 18 further closed thirty degrees as shown in FIG. 5.

In FIG. 6, the film wind wheel 68 is rotated via the motor 88 further in the film winding direction 72 than in FIG. 5 to draw the trailing film end portion 22 further into the interior of the cassette shell 12 and to make the arcuate rib 84 pivot the lever end 82 to rotate the locking lever 76 and the second spur gear 74 clockwise in FIG. 5 about the mount-pin 78 until the lever end is pivoted out of the gap 104. Consequently, the actuator unit 54 is rotated counter-clockwise in FIG. 6 via the first and second spur gears 66 and 74 to make the drive-part 62 similarly pivot the light lock 18 further closed thirty-two degrees as shown in FIG. 6, to completely close the light lock.

At this time, an end finger 106 of the locking lever 76 is moved against the resilient switch element 98 to separate that switch element from the rigid switch element 100 to open the closed switch 96 to turn off the drive motor 88. Substantially simultaneously, a locking tooth 108 on the underside of the locking lever 76 is moved into engagement with an adjacent pair of the peripheral teeth 94 of the film wind wheel 68 to prevent further rotation of the wheel in the film winding direction 72 as shown in FIG. 6. The locking tooth 108 secures the wheel 68 with the spool 14 at the predetermined second-obtuse angle of rotation. As shown in FIGS. 11 and 12, when the spool 14 is at the predetermined second-obtuse angle of rotation 46 the indicator flag 30 is at the same angle and, therefore is positioned in the window 36 to provide a visual film-completely-exposed warning or indication.

Figure 15:
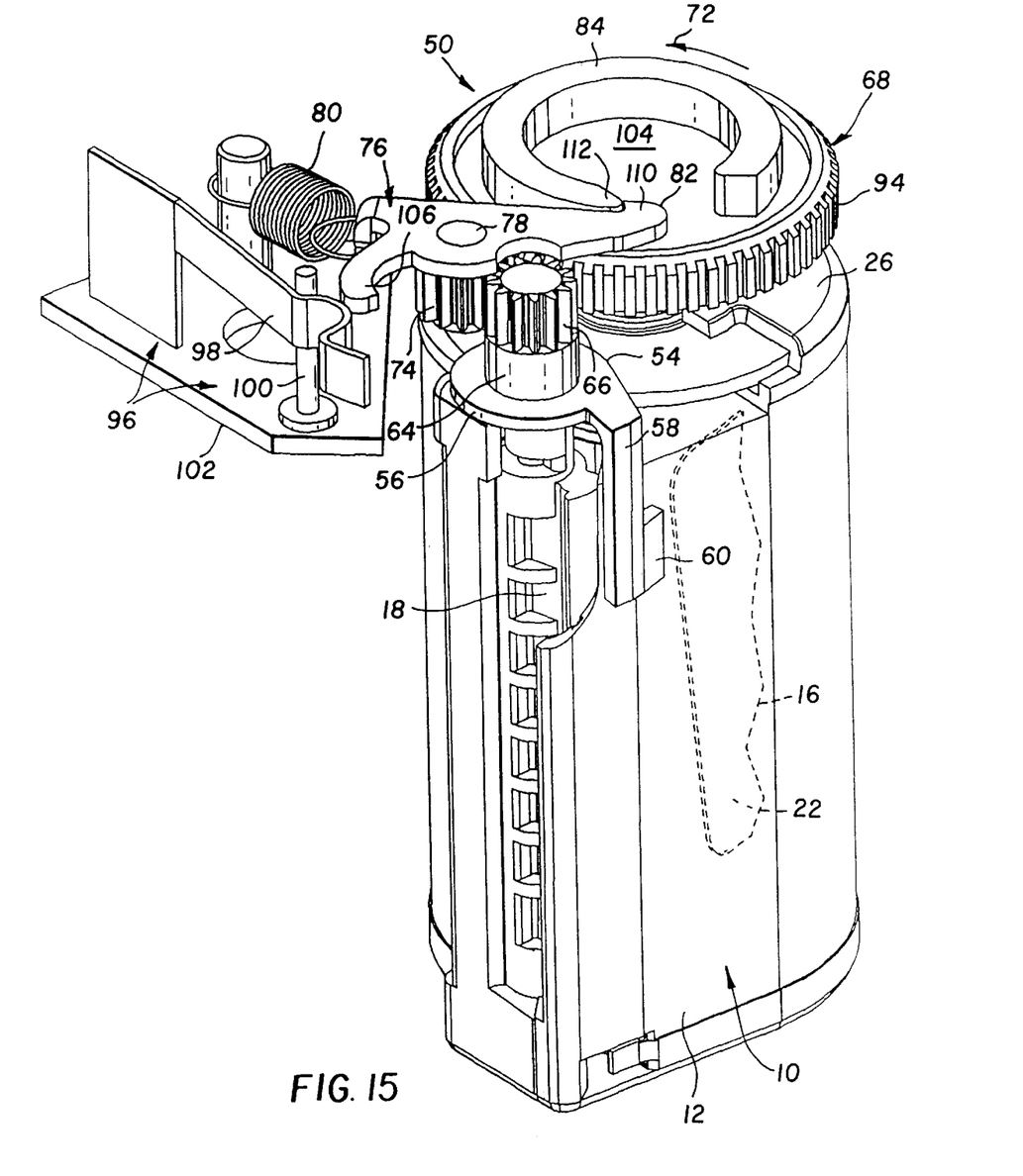
FIG. 15 is an exploded partial perspective view of the camera for use with the film cassette, according to an alternate embodiment of the invention.

The invention has been described with reference to a preferred embodiment. However, it will be appreciated that variations and modifications can be effected by a person of ordinary skill in the art without departing from the scope of the invention. For example, instead of the locking tooth 108 on the underside of the locking lever 76, the lever end 82 can have a hooked end 110 that engages one end 112 of the arcuate rib 84 as shown in FIG. 15 to prevent further rotation of the film wind wheel 68 in the film winding direction 72 (much in the same way the locking tooth does).

PARTS LIST 10. film cassette
12. cassette shell
14. flanged spool
16. filmstrip
18. light lock
20. slot
22. trailing film end portion
24. drive cavity
26. drive end
28. drive cavity
30. indicator flag
32. window
34. window
36. window
38. window
40. VEI end
42. acute angle of rotation
44. first-obtuse angle of rotation
46. second-obtuse angle of rotation
48. third-obtuse angle of rotation
50. camera
52. cassette chamber
54. actuator unit
56. driver
58. film sensor lever
60. sensor head
62. drive-part
64. gear-support-part
66. first spur gear
68. film winder wheel
70. drive-part
72. film winding direction
74. second spur gear
76. locking lever
78. mount-pin
80. tension spring
82. lever end
84. arcuate rib
86. slight distance
88. drive motor
90. pinion gear
92. driven gear
94. wheel teeth
96. switch
98. resilient switch element
100. rigid switch element
102. circuit board
104. gap
106. end finger
108. locking tooth
110. hooked lever end
112. rib end

What is claimed is:

1. A camera for use with a film cassette having a spool rotatable to wind an exposed filmstrip including a trailing film end portion into the cassette and a light lock movable to be closed after the trailing film end portion is wound into the cassette, comprising a film winder rotatable in engagement with the spool in a film winding direction to rotate the spool in the same direction to wind the exposed filmstrip including the trailing film end portion into the cassette, and a locking device coupled with the light lock for movement to prevent further rotation of said film winder in the film winding direction when the light lock is closed, is characterized in that:

a drive motor is drivingly connected with said film winder to rotate the film winder in the film winding direction; and a motor switch capable of changing state to turn off said drive motor is positioned with respect to said locking device for movement of the locking device to prevent further rotation of said film winder in the film winding direction when the light lock is closed to cause said motor switch to change state to turn off said drive motor.

2. A camera as recited in claim 1, wherein said locking device is supported for said film winder to pivot the locking device, when the film winder is rotated in the film winding direction, to move the locking device into arresting engagement with the film winder to prevent further rotation of the film winder in the film winding direction and against said motor switch to cause the motor switch to change state to turn off said drive motor.

3. A camera for use with a film cassette having a spool rotatable to wind an exposed filmstrip including a trailing film end portion into the cassette and a light lock movable to be closed after the trailing film end portion is wound into the cassette, comprising a film winder rotatable in engagement with the spool in a film winding direction to rotate the spool in the same direction to wind the exposed filmstrip including the trailing film end portion into the cassette, and a closing actuator movable in engagement with the light lock to close the light lock, is characterized in that:

a drive motor is drivingly connected with said film winder to rotate the film winder in the film winding direction; and a motor switch capable of changing state to turn off said drive motor is positioned with respect to said closing actuator for movement of the closing actuator to close the light lock to cause said motor switch to change state to turn off the drive motor.

* * * * *